US012755011B2

(12) United States Patent
Preimesberger et al.

(10) Patent No.: US 12,755,011 B2
(45) Date of Patent: Oct. 6, 2026

(54) VALIDATING HARDWARE PROCESSORS USING SIGNED ENCLAVE IMAGES

(71) Applicant: HEWLETT PACKARD ENTERPRISE DEVELOPMENT LP, Spring, TX (US)

(72) Inventors: Lee A Preimesberger, Spring, TX (US); Grant OConnor, Spring, TX (US); Jonathan R. Mooty, Spring, TX (US); Vartan Yosef Kasheshian, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 148 days.

(21) Appl. No.: 18/929,843

(22) Filed: Oct. 29, 2024

(65) Prior Publication Data

US 2026/0119649 A1 Apr. 30, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 2221/034; G06F 21/554
See application file for complete search history.

(56) References Cited

U.S. PATENT DOCUMENTS 10,726,120 B2 * 7/2020 Negi ........................ G06F 21/72
2016/0180078 A1 * 6/2016 Chhabra ................. G06F 21/57 726/19
2021/0328971 A1 * 10/2021 Bandi ...................... G06F 21/53
2022/0345378 A1 * 10/2022 Guyan ................. G09G 3/3453
2024/0020425 A1 * 1/2024 Briongos ................ G06F 21/74
2024/0214185 A1 * 6/2024 Li ........................... H04L 9/083
2025/0233758 A1 * 7/2025 Ponnuru ............... H04L 9/3247

OTHER PUBLICATIONS

Felix Cloutier; "CPUID—CPU Identification"; downloaded from https://www.felixcloutier.com/x86/cpuid on Oct. 28, 2024; published Dec. 2023; 32 pp.
Intel; "SGX 101"; downloaded from https://sgx101.gitbook.io/sgx101/sgx-bootstrap/overview on Oct. 28, 2024; 6 pp.

(Continued)

*Primary Examiner* — David J Pearson
*Assistant Examiner* — Daniel Elahian
(74) *Attorney, Agent, or Firm* — Trop, Pruner & Hu, P.C.

(57) ABSTRACT

A technique includes, responsive to a boot of a computer platform, selecting a signed enclave image based on a socket identifier associated with the hardware processor. The signed enclave image corresponds to a hardware processor identity. The technique includes, responsive to the boot of the computer platform, validating the hardware processor. The validation includes providing a request for the hardware processor to create an enclave based on the signed enclave image. The validation includes, based on a response of the hardware processor to the request, determining whether the hardware processor identity corresponds to the hardware processor.

20 Claims, 7 Drawing Sheets

(56) References Cited

OTHER PUBLICATIONS

Github; "Using the Open Enclave Host-Verify SDK on Windows"; downloaded from https://github.com/openenclave/openenclave/blob/master/docs/GettingStartedDocs/buildandsign.md on Oct. 28, 2024; 2 pp.

Felix Cloutier; "Egetkey—Retrieves a Cryptographic Key;" downloaded from https://www.felixcloutier.com/x86/egetkey on Oct. 28, 2024; published Dec. 2023; 10 pp.

Jeremy Powell, "AMD SEV-SNP Attestation: Establishing Trust in Guests", Sep. 2022, 21 Pages.

* cited by examiner

VALIDATING HARDWARE PROCESSORS USING SIGNED ENCLAVE IMAGES

BACKGROUND

A computer platform may be subject to a security attack for such purposes as seeking access to information that is stored on the computer platform or harming components of the computer platform. To prevent or at least inhibit the degree of potential harm inflicted by security attacks, a computer platform may have different levels of security protection.

DETAILED DESCRIPTION

Figure 1:
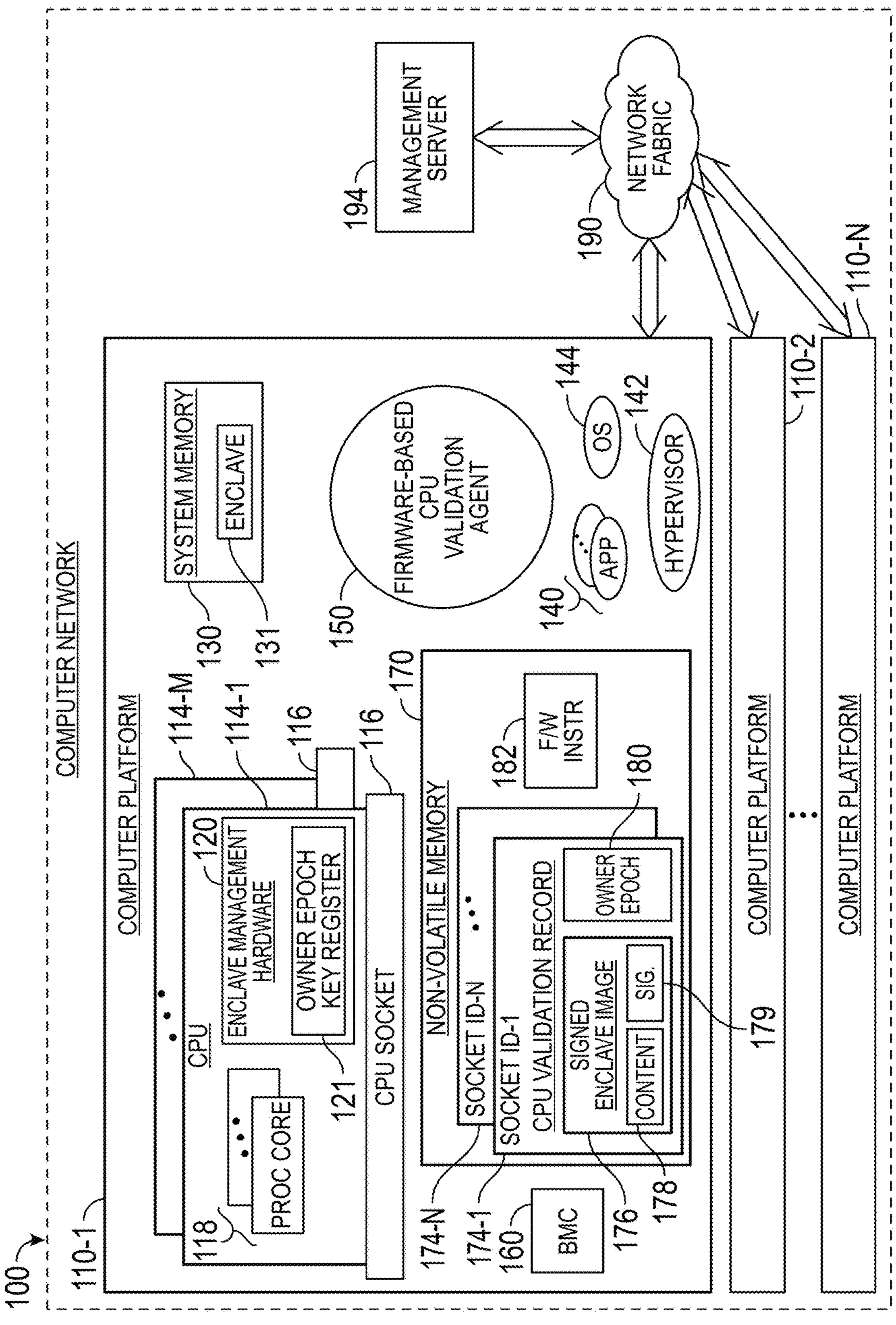
FIG. 1 is a block diagram of a computer network having a computer platform that includes a central processing unit (CPU) validation infrastructure that validates CPUs of the computer platform using signed enclave images, according to an example implementation.

As modern hardware root-of-trust technologies make it ever-increasingly difficult for attackers to gain access to servers, nefarious individuals may seek to compromise servers through physical tampering. In this context, physically tampering with a server refers to one or multiple unauthorized actions being performed on the server by an attacker who has in-person access to the server. Physical tampering may occur after a server is deployed in service, or physical tampering may occur in the supply chain after the server leaves the original equipment manufacturer (OEM) but before the server is deployed in service.

Server CPUs may be physical tampering targets. For example, a server's CPUs may be replaced with CPUs with known vulnerabilities as part of preparations for a planned future security attack on the server or on the server's network. In another example, high-end, higher value CPUs of a server may be stolen and replaced with lower value CPUs to conceal the theft.

Unauthorized CPU replacement may go unnoticed, as a CPU may be swapped with a CPU of the same or similar model. For example, an attacker may swap out an OEM-installed CPU with a CPU that was provided as a sample by the CPU manufacturer. The replacement CPU may correspond to the same model as the OEM-installed CPU, but the sample CPU may be an earlier stepping, or version, which has a known security vulnerability. In another example, an attacker may swap out an OEM-installed CPU with a replacement CPU of the same model and perhaps even of the same version, but the replacement CPU includes a built-in spy die or any of a number of other features that expose the server to security intrusions.

Therefore, for any of a number of reasons, the owner of a server may want to validate the individual CPUs of the server for purposes of learning whether any OEM-installed CPUs have been replaced. In one approach to validating a CPU, an instruction (e.g., a CPUID instruction) is executed by the CPU, which causes the CPU to self-report information about the CPU. Due to privacy concerns, the self-reported information may not associate the CPU with a unique identifier, such as a serial number, however. Instead, the self-reported information may merely reveal general details (e.g., a model number, capabilities or a stepping) about the CPU, which fail to uniquely identify the CPU. Moreover, even if a particular CPU model self-reports its serial number, a sophisticated adversary may potentially install a CPU that self-reports a fake or spoofed serial number. Therefore, for any of a number of reasons, unauthorized replacement of a CPU may go undetected.

In accordance with example implementations, a firmware-based CPU validation agent (called the "CPU validation agent" herein) of a computer platform (e.g., a server) uses a CPU's built-in enclave management hardware to provide an indication as to whether or not the CPU corresponds to a certain CPU identity. More specifically, in accordance with example implementation, the CPU validation agent is constructed to validate a CPU (called the "evaluated CPU" herein) for purposes of determining whether or not the CPU is the original CPU (called the "expected CPU") that was installed in the computer platform by the OEM. The CPU validation agent requests the evaluated CPU to load an enclave image that is signed by the expected CPU (e.g., an enclave image signed by the expected CPU before the computer platform shipped from the OEM). The CPU validation agent uses the evaluated CPU's response to the load request as an indicator of whether or not the evaluated CPU and the expected CPU are the same.

A CPU having built-in enclave management hardware generally processes a request to load a signed enclave image as follows. The CPU first validates the signed enclave image using a decryption key that corresponds to the CPU's cryptographic signing key. In an example, the cryptographic signing key is a symmetric key that is used for purposes of encryption and decryption. The cryptographic signing key is unique to the CPU, and the CPU derives the cryptographic signing key internally using a key derivation function. The CPU does not allow the cryptographic signing key to be exported or otherwise exposed outside of the CPU. If the signed enclave image is not signed by the CPU's cryptographic signing key, then the image fails the CPU's validation, the CPU does not load the signed enclave image, and the CPU generates an error representing a failure of the request to load the signed enclave image. If the signed enclave image is signed by the CPU's cryptographic signing key, then the image passes the CPU's validation, the CPU loads the signed enclave image, and the CPU launches the corresponding enclave.

The CPU validation agent validates the CPUs of the computer platform taking into account the CPU sockets in which respective CPUs are installed. In this manner, an evaluated CPU is installed in a particular CPU socket of the computer platform, and the CPU validation agent determines whether or not the evaluated CPU is the expected CPU that was originally installed in the same CPU socket.

To validate an evaluated CPU, the CPU validation agent causes the evaluated CPU to execute instructions that correspond to a request for the evaluated CPU to load a signed enclave image that has been signed by the expected CPU using the expected CPU's cryptographic signing key. Whether or not the request succeeds depends on whether the signed enclave image is cryptographically signed by the evaluated CPU's cryptographic signing key. If the signed enclave image is signed by the evaluated CPU's cryptographic signing key, then the request succeeds, and the evaluated CPU launches the corresponding enclave. Otherwise, the request fails. The CPU validation agent, responsive to the request succeeding, determines that the evaluated and expected CPUs are the same, and conversely, the CPU validation agent, responsive to the request failing, determines that the evaluated and expected CPUs are different.

In accordance with example implementations, the CPU validation agent notifies a management controller (e.g., a baseboard management controller (BMC)) about a failed CPU validation. The management controller, in response to a failed CPU validation, may perform one or multiple remedial actions (e.g., generating an alert, logging an entry representing that the CPU did not pass validation, preventing the computer platform from joining a network, aborting a boot of the CPU, or regulating a reboot of the computer platform).

Among the potential advantages, the CPU validation that is described herein does not rely on self-reported identifying information. Therefore, the CPU validation is not affected by rogue CPUs reporting false or spoofed identifying information. The CPU validation process does not expose information that uniquely identifies the CPUs.

Referring to FIG. 1, as a more specific example, a computer network 100 includes a collection of computer platforms 110 (computer platforms 110-1, 110-2 to 110-N being depicted in FIG. 1). The computer network 100 may correspond to any of a number of computing environments. In an example, the computer network 100 corresponds to a cloud, which has resources that can be scaled up and down on demand. In a more specific example, the computer network 100 corresponds to a private cloud that is managed by a business entity and has on-premise resources that are located in the business entity's private datacenter, are located in leased space of a co-location datacenter, or some combination thereof. In another example, the computer network 100 corresponds to a hybrid cloud that has on-premise resources that are managed by a public cloud operator. In another example, the computer network 100 corresponds to a public cloud. In another example, the computer network 100 correspond to a non-cloud private computing environment.

In the context that is used herein, a "computer platform" is a modular unit, which includes a frame, or chassis; and hardware that is mounted to the chassis and is capable of executing machine-readable instructions. In an example, a computer platform 110 is a server, such as an enclosure-based server (e.g., a blade server), a rack server (e.g., a density line (DL) server), or a tower server. In other examples, the computer platform 110 may be a component other than a server, such as a client, a desktop, a gateway, a network switch, a storage array, a laptop computer, a tablet computer, a consumer electronics device, an appliance, or, in general, any other processor-based electronic device.

The computer platforms 110 are interconnected by network fabric 190. In accordance with example implementations, the network fabric 190 may be associated with one or multiple types of communication networks, such as, in examples, Remote Direct Memory Access (RDMA) fabric, Fibre Channel fabric, InfiniBand fabric, Compute Express Link (CXL) fabric, dedicated management networks, local area networks (LANs), wide area networks (WANs), global networks (e.g., the Internet), wireless networks, or any combination thereof.

Components for an example computer platform 110-1 are depicted in FIG. 1. Other computer platforms 110 may have different compositions of components and different architectures than the computer platform 110-1. In accordance with example implementations, each computer platform 110 has a CPU validation infrastructure similar to a CPU validation infrastructure of the computer platform 110-1, as described herein.

The computer platform 110-1 includes a collection of M CPUs 114 (CPUs 114-1 and 114-M being depicted in FIG. 1). In this context that is used herein, a "CPU" refers to a general-purpose hardware processor having one or multiple processing cores 118. The CPU 114 is associated with a package, such as a Land Grid Array (LGA) package, a Pin Grid Array (PGA) package, a Ball Grid Array (BGA) package or a package that corresponds to another encapsulation technology.

Each CPU 114 is received in a respective CPU slot connector, or socket 116 (herein called the "CPU socket 116"), which electrically couples and mechanically mounts the CPU 114 to a motherboard of the computer platform 110-1. A CPU socket 116 has an associated socket identifier (called the "CPU socket ID" herein), and accordingly, each CPU 114 is associated with a different CPU socket ID. As depicted in FIG. 1, in accordance with example implementations, the CPU 114 has enclave management hardware 120. The enclave management hardware 120 corresponds to a circuit that manages execution of a set of CPU-level instructions to create and enforce trusted execution environments called "enclaves." In an example, a CPU 114 is an INTEL CPU, and the enclave management hardware 120 corresponds to a Software Guard Extensions (SGX) security technology.

The computer platform 110-1 further includes a system memory 130. In general, the memory devices that form the system memory 130, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In the context that is used herein, an "enclave" corresponds to a trusted execution environment having an associated secure region of memory (e.g., a secure region of the system memory 130) that has a cryptographically-protected outer perimeter, or boundary. An example enclave 131 is depicted in FIG. 1 inside the system memory 130. Data and instructions inside the enclave 131 cannot be read or examined via instructions that are located outside of the enclave 131. This prevents an entity having an elevated privilege, such as an operating system 144 or a hypervisor 142 of the computer platform 110-1, from reading or examining the content of the enclave 131.

An application process 140 may, for example, have trusted instructions that execute inside the enclave 131 and untrusted instructions that execute outside of the enclave 131. The trusted instructions and untrusted instructions communication across the cryptographic boundary of the enclave 131 via calls that are wrapped by proxy functions. In an example of the proxy functions, for purposes of invoking an application programming interface (API) that is provided by and exposed by the trusted instructions, the untrusted instructions call an untrusted proxy function for the API. In response to the call by the untrusted instructions, the untrusted proxy function calls a trusted proxy function for the API inside the enclave 131. In response to the call by the untrusted proxy function, the trusted proxy function calls the API that is provided by the trusted instructions. The corresponding API response returns in the reverse direction from the trusted proxy function, then to the untrusted proxy function and then to the untrusted instructions.

In another example of the proxy functions, for purposes invoking an API that is provided by and exposed by the untrusted instructions, the trusted instructions call a trusted proxy function for the API. In response to the call from the trusted instructions, the trusted proxy function calls an untrusted proxy function for the API outside of the enclave 131. In response to the call from the trusted proxy function, the untrusted proxy function calls the API that is provided by the untrusted instructions. The corresponding API response returns in the reverse direction from the untrusted proxy function, then to the trusted proxy function and then to the trusted instructions.

The enclave 131 is associated with a collection of cryptographic keys that are unique to the enclave 131 and protected by the enclave management hardware 120 of the CPU 114. The enclave management hardware 120 does not allow the cryptographic keys to be exported or otherwise exposed outside of the CPU 114. A cryptographic sealing key is an example of such a key. The CPU 114 uses the cryptographic sealing key to seal, or encrypt, data to be exported from the secure enclave 131. In an example, the cryptographic sealing key is a symmetric key that is used for purposes of encryption and decryption, and the CPU 114 uses the cryptographic sealing key to decrypt encrypted data that is imported into the enclave 131.

A cryptographic signing key is another example of a cryptographic key that the enclave management hardware 120 does not allow to be exported or otherwise exposed outside of the CPU 114. The CPU 114 internally derives the cryptographic signing key by applying a key derivation function to multiple input keys (or "key components"). In an example, the cryptographic signing key is an Advanced Encryption Standard (AES) key, which is a symmetric key. In an example, one of the input keys (called the "fuse key") provided to the key derivation function is unique to the CPU 114, is protected from being exported or otherwise exposed outside of the CPU 114, and is set by one-time-programmable (OTP) fuses of the CPU 114. In another example, another input key (the "version key") provided to the key derivation function corresponds to a version associated with the CPU 114, such as a version of the CPU's microcode or an enclave software version associated with the CPU 114.

In another example, an input key (called an "owner epoch" herein) provided to the key derivation function allows an owner to add additional uncertainty, or entropy, to the derivation of the cryptographic signing key. For this purpose, the enclave management hardware 120 includes an owner epoch key register 121 that may be written with an owner epoch value. The key derivation function used to derive the cryptographic signing key may have other and/or different key inputs, in accordance with further implementations. Regardless of how the cryptographic signing key is derived, the cryptographic signing key is unique to the CPU 114. This allows a cryptographic signature that is generated by the CPU 114 to be used to verify the CPU's identity. The verification of a CPU's identity for purposes of authenticating the CPU 114 is referred to herein as "validating" the CPU 114.

The CPU platform 110-1 has a CPU validation infrastructure that includes a firmware-based CPU validation agent 150 (herein called the "CPU validation agent 150" herein) and N CPU validation records 174 (validations 174-1 and 174-N being specifically depicted in FIG. 1). The N CPU validation records 174 correspond to N respective CPU socket IDs (and therefore, N respective CPU sockets 116). In an example, as depicted in FIG. 1, the CPU validation record 174-1 is associated with a "CPU socket ID-1," and the CPU validation record 174-N is associated with a "CPU socket ID N." The CPU validation records 174 are stored in a non-volatile memory 170 (e.g., a NAND flash memory or a non-volatile random access memory (NVRAM)) of the computer platform 110-1. As described further herein, the CPU validation records 174 may be generated and stored in the non-volatile memory 170 before the computer platform 110-1 leaves the OEM's facility.

In accordance with example implementations, the CPU validation agent 150 corresponds to firmware that is executed as part of a boot sequence (or "boot") for the computer platform 110-1. In an example, the CPU validation agent 150 corresponds to a firmware boot application, such as a Unified Extensible Firmware Interface (UEFI) boot application. The UEFI is described in the "Unified Extensible Firmware Interface (UEFI) Specification," Release 2.1, Aug. 29, 2022, which is published by the UEFI Forum, Inc. In accordance with example implementations, one of the CPUs 114 is designated as a "boot CPU," which executes instructions during a boot of the computer platform 110-1. For the following discussion, it is assumed that the CPU 114-1 is the boot CPU. As part of the boot, the boot CPU 114-1 loads and executes various firmware components, including a firmware component that corresponds to firmware instructions 182. The boot CPU 114-1 executing the firmware instructions 182 forms the CPU validation agent 150.

As described herein, by executing the firmware instructions 182, the boot CPU 114-1 validates all M CPUs 114, and in accordance with example implementations, the boot CPU 114-1 validates the M CPUs 114 one at a time. The particular given CPU 114 being validated by the boot CPU 114-1 is referred to herein as the "evaluated CPU 114." As can be appreciated, the boot CPU 114-1, in accordance with example implementations, validates itself, and when this occurs, the boot CPU 114-1 is also the evaluated CPU 114. Otherwise, the boot CPU 114-1 and the evaluated CPU (e.g., CPU 114-M) are different.

To validate a particular evaluated CPU 114, the CPU validation agent 150 first identifies the CPU validation record 174 (herein called the "identified CPU validation record 174") that corresponds to the evaluated CPU 114. In this manner, the identified CPU validation record 174 corresponds to the CPU socket ID of the CPU socket 116 in which the evaluated CPU 114 is installed. The identified CPU validation record 174 includes a signed enclave image 176 that is signed by a cryptographic signing key of a CPU (called the "expected CPU" herein) that is expected to be installed in the CPU socket 116. In an example, the expected CPU is the original CPU installed by the OEM. In addition to the signed enclave image 176, the identified CPU validation record 174 also includes data that represents an owner epoch 180. From the identified CPU validation record 174, the CPU validation agent 150 reads the owner epoch 180 and loads the owner epoch 180 into an owner epoch key register 121 of the evaluated CPU 114.

The signed enclave image 176 and the owner epoch value 180 are uniquely linked to the expected CPU. In this manner, the owner epoch 180 corresponds to the value that was loaded into the owner epoch key register of the expected CPU and used by the expected CPU's key derivation function to generate the expected CPU's cryptographic signing key. The expected CPU, using a cryptographic signing key that was derived internally by the expected CPU based on the owner epoch value 180, signed an enclave image to produce the signed enclave image 176.

As depicted in FIG. 1, the signed enclave image 176 includes a content 178 and a signature 179. In an example, to create the signed enclave image 176, the expected CPU applied a cryptographic hash algorithm to the content 178 to produce a hash, and the expected CPU encrypted the hash using its cryptographic sealing key to produce the signature 179. In an example, the signed enclave image 176 corresponds to a file having a body that contains the content 178 and a header that contains the signature 179.

After the CPU validation agent 150 loads the owner epoch value 180 from the identified CPU validation record 174 into the evaluated CPU 114, the CPU validation agent 150 then requests the evaluated CPU 114 to perform an operation that reveals whether or not the evaluated CPU 114 is the expected CPU. More specifically, the CPU validation agent 150 requests the evaluated CPU 114 to load the signed enclave image 176 (of the identified CPU validation record 174), and the CPU validation agent 150 observes the response of the evaluated CPU 114 to the load request.

When processing the request to load the signed enclave image 176, the enclave management hardware 120 of the evaluated CPU 114 validates the signed enclave image 176 using a cryptographic decryption key that corresponds to the evaluated CPU's cryptographic signing key. In an example, the cryptographic signing key is a symmetric key, and the evaluated CPU 114 uses the cryptographic signing key for purposes of encryption and decryption. More specifically, the evaluated CPU 114 applies the cryptographic signing key to the signature 179 to decrypt the signature 179 to determine a first hash, and the evaluated CPU applies a hash algorithm to the content 178 of the signed enclave image 176 to derive a second hash. The evaluated CPU 114 compares the first and second hashes. If the hashes are the same, then the evaluated CPU 114 is the expected CPU, and the evaluated CPU 114 launches an enclave that corresponds to the signed enclave image 176. If the hashes are different, then the evaluated CPU 114 is different than the expected CPU, as revealed by the CPUs having different cryptographic signing keys. Responsive to a hash mismatch, the evaluated CPU 114 generates an error, and the attempted enclave load request fails.

The CPU validation agent 150 observes the evaluated CPU's response to the request to load the signed enclave image 176. The CPU validation agent 150 determines that the evaluated CPU 114 passes the validation (and therefore, is the same as the expected CPU) in response to the request being successful. The CPU validation agent 150 determines that the evaluated CPU 114 fails validation (and therefore, is different than the expected CPU) in response to a failure of the request (e.g., a failure indicated by an error).

The CPU validation agent 150, in accordance with example implementations, reports CPU validation results to a management controller of the computer platform 110-1. A BMC 160 of the computer platform 110-1 is an example of such a management controller. The BMC 160, in general, provides management service for the computer platform 110-1. One of these management services, in accordance with example implementations, is to perform one or multiple remedial actions responsive to a CPU 114 failing validation.

In an example of a remedial action taken due to a CPU validation failure, the BMC 160 sends a message to a remote management server 194, reporting the CPU validation failure. In an example, the message contains data representing information about the CPU validation failure, such as the CPU socket ID, information about the expected CPU and a detection timestamp. In another example of a remedial action taken due to a CPU validation failure, the BMC 160 records information (e.g., CPU socket ID, expected CPU information and a detection timestamp) about the CPU validation failure in a computer platform event log. In another example of a remedial action taken due to a CPU validation failure, the BMC 160 powers down the main power supply of the computer platform 110-1. Upon the next boot of the computer platform 110-1, the BMC 160 (which operates on an auxiliary power supply) generates a displayed prompt that informs of the CPU validation failure and requests authorization of the boot by a user having the appropriate administrative credentials before allowing the boot to continue. In another example of a remedial action taken in response to a CPU validation failure, the BMC 160 does not allow the computer platform 110-1 to join the fleet of computer platforms 110. In another example of a remedial action taken in response to a CPU validation failure, the BMC 160 requests authorization by a user having the appropriate administrative credentials before allowing the computer platform 110-1 to join the fleet of computer platforms 110.

As part of its management plane, the BMC 160 may provide a variety of management services in addition to services related to CPU validation. In examples, the other management services include monitoring environmental sensors (e.g., temperature sensors, cooling fan speed sensors); monitoring an operating system status; monitoring power statuses; logging computer system events; providing virtual media management functions; and performing remotely-controlled computer platform functions. The BMC 160 may also provide security services (e.g., cryptographic services) for the computer platform 110-1 as part of the BMC's security plane.

In accordance with example implementations, the CPU validation records 174 may be stored in a non-volatile memory having an access that is controlled by the BMC 160. For example, referring to FIG. 2A, in accordance with example implementations, in an architecture 201, CPU validation records 274 are stored in a non-volatile memory 273 of a BMC 260. The BMC 160 of FIG. 1 is an example of the BMC 260. Moreover, the CPU validation records 174 of FIG. 1 are examples of the CPU validation records 274.

The non-volatile memory 273 is located inside a secure enclave 262 of the BMC 260. In this context, a "secure enclave" of the BMC 260 refers to a subsystem of the BMC 260 for which access into and out of the subsystem is tightly controlled. In accordance with example implementations, the secure enclave 262 corresponds to the BMC's security plane and includes a security processor 275 that performs security services (e.g., cryptographic processing and monitoring environmental signals for tampering) for the computer platform and is fully disposed inside a cryptographic boundary. A "cryptographic boundary" in this context refers to a continuous boundary, or perimeter, which contains the logical and physical components of a cryptographic subsystem, such as BMC components that form the secure enclave 262.

The BMC 260 includes one or multiple processing cores 264 that are located outside of the secure enclave 262 and are associated with the BMC's management plane. The processing core(s) 264 execute a firmware management stack for purpose of performing management services for the BMC 260. In accordance with example implementations, the secure enclave 262 may provide one or multiple application programming interfaces (APIs) for accessing the CPU validation records 274. The BMC's management plane (and in particular, one or multiple processing cores 264) may serve as a proxy for the secure enclave 262 for exchanges, or sessions, between the computer platform's host and the secure enclave 262.

A component of the computer platform's host, such as a CPU validation agent (the CPU validation agent 150 of FIG. 1), may access the CPU validation records 274 through a host interface 266 of the BMC 260. The host interface 266 is connected to the host via host connections 267 (e.g., connections to one or multiple input/output (I/O) bridges of the computer platform). Serving as a proxy for the secure enclave 262, the BMC's management plane may receive calls, or requests, from requestors to the APIs of the secure enclave 262 and forward the requests to the secure enclave 262 for processing. Moreover, as serving as the proxy, the BMC's management plane may further forward responses to these requests from the secure enclave 262 to the requestors. In an example, the CPU validation agent may call one of these APIs for purposes of accessing a CPU validation record 274 corresponding to a particular CPU socket ID.

Figure 2A:
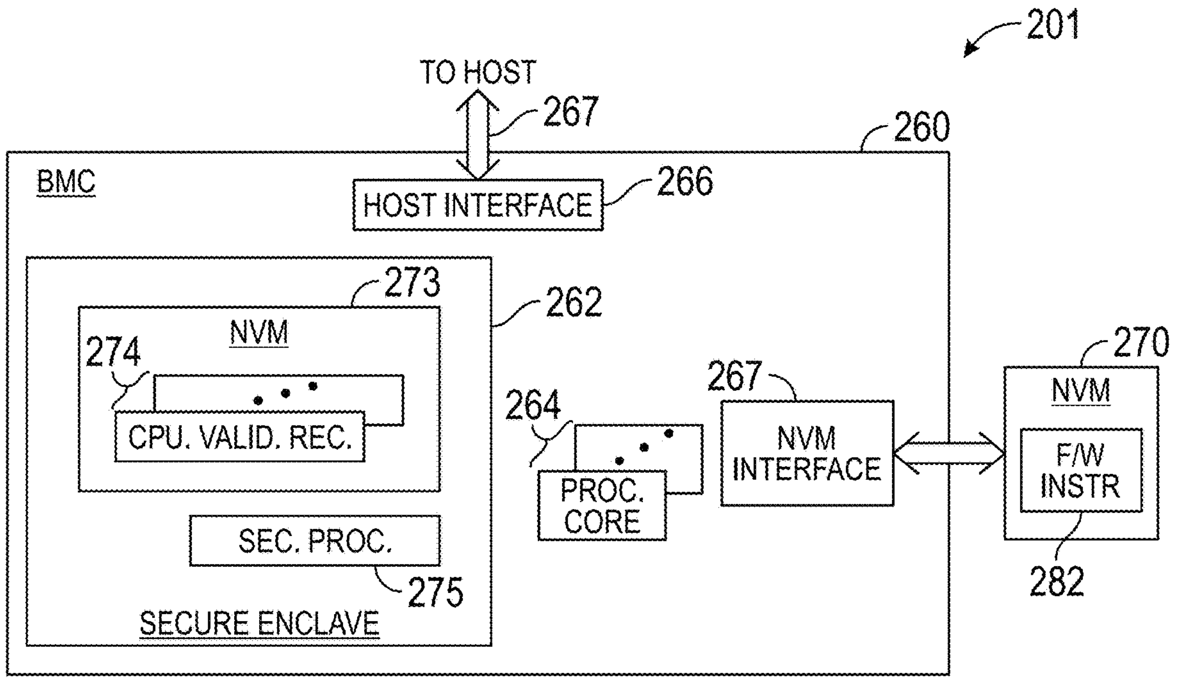
FIGS. 2A and 2B illustrate architectures to store CPU validation records according to example implementations.

As depicted in FIG. 2A, the BMC 260 may include a non-volatile memory interface 267 that provides access to another non-volatile memory 270 that is external to the BMC 260 and whose access is controlled by the BMC 260. In an example, the non-volatile memory 270 may store system firmware instructions, including firmware instructions 282 that are executed by a boot CPU (e.g., the boot CPU 114-1 of FIG. 1) for purposes of providing a CPU validation agent (e.g., the validation agent 150 of FIG. 1).

Figure 2B:
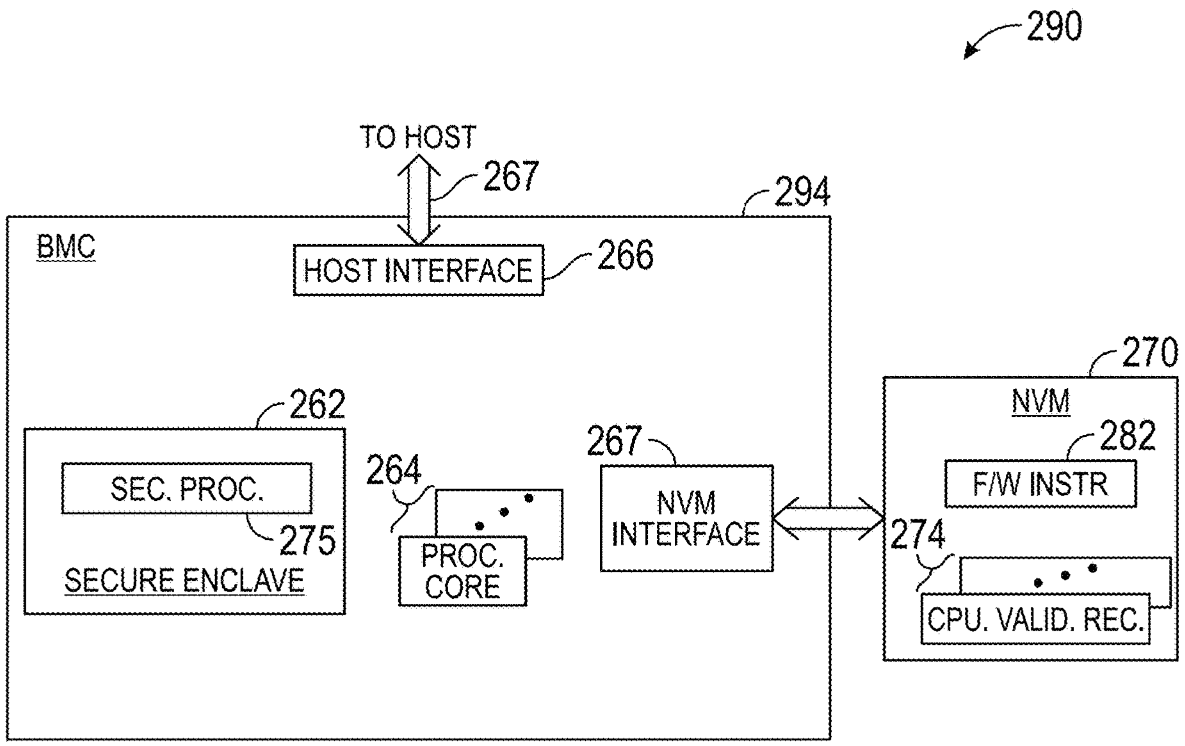

FIG. 2B depicts another architecture 290 for storing the CPU validation records 274. Referring to FIG. 2B, the architecture 290 includes a BMC 294 that is similar to the BMC 290 of FIG. 2A, with the same reference numerals being used to denote similar components. Unlike the architecture 201 of FIG. 2A, for the architecture 290, the CPU validation records 274 are stored outside of the BMC 294 in the non-volatile memory 270. The BMC 294 controls access to the non-volatile memory 270, including access to the CPU validation records 274. In an example, the CPU validation agent may call an API that is provided by the BMC's management plane for purposes of accessing a CPU validation record 274 stored in the non-volatile memory 270.

Figure 3:
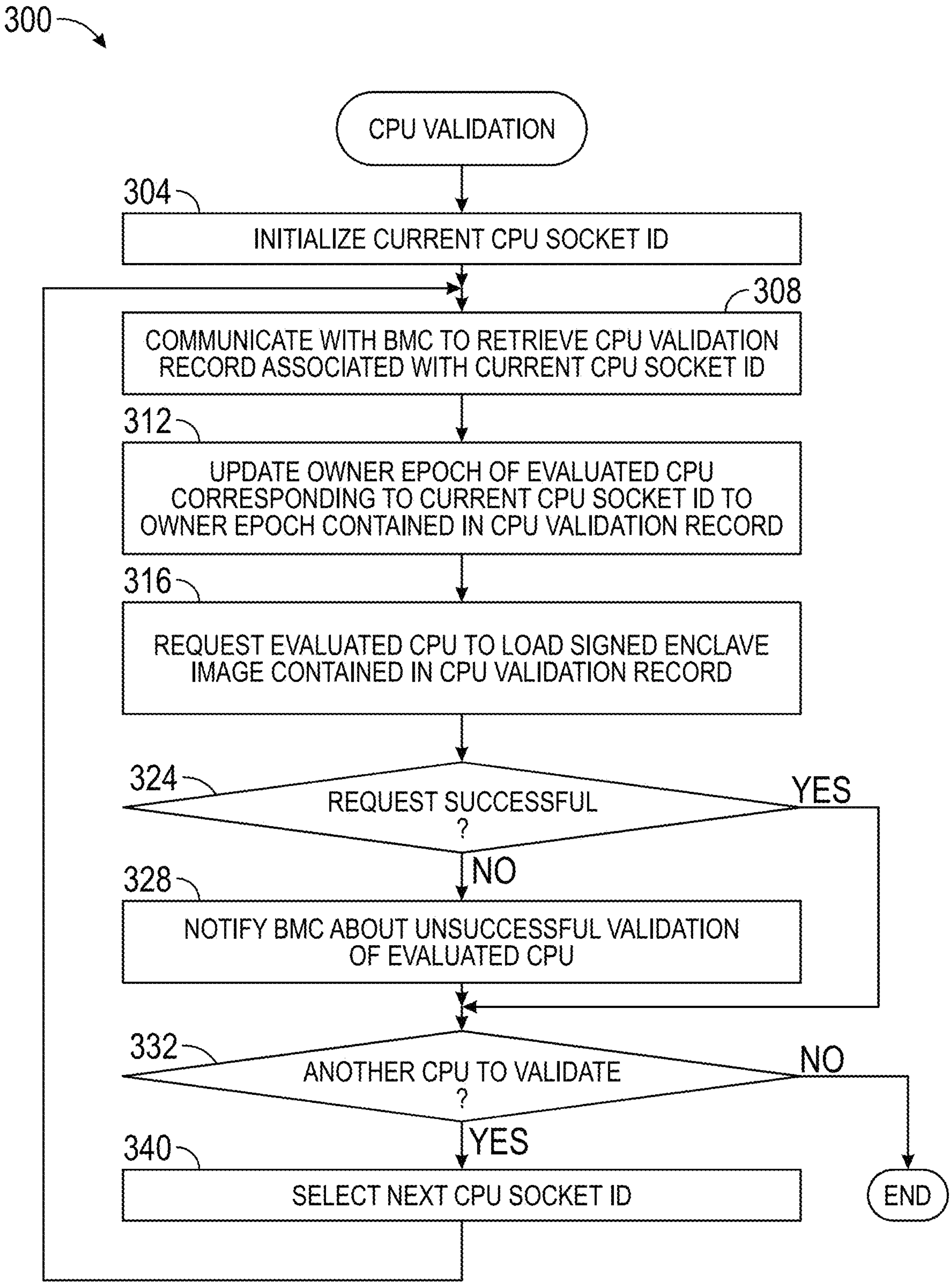
FIG. 3 is a flow diagram depicting a technique to validate CPUs of a computer platform using signed enclave images, according to an example implementation.

FIG. 3 depicts a technique 300 to validate CPUs of a computer platform in accordance with example implementations. The technique 300 is performed by a CPU validation agent. The CPU validation agent 150 of FIG. 1 is an example of such a CPU validation agent. In accordance with example implementations, the CPU validation agent corresponds to an UEFI firmware application that is executed by a boot CPU of the computer platform during a boot of the computer platform. At the beginning of the boot, the non-boot CPUs of the computer platform are held in reset. For purposes of evaluating a given non-boot CPU, the non-boot CPU is released from reset.

Referring to FIG. 3, the technique 300 begins by the boot CPU initializing (block 304) a current CPU socket ID. The technique 300 performs multiple iterations (called "CPU validation iterations" herein) of blocks 308 to 340. Each CPU validation iteration corresponds to a different CPU socket ID of a sequence of CPU socket IDs. In each iteration, the technique 300 validates the CPU that is installed in the CPU socket corresponding to the current CPU socket ID. The "initialization" of the current CPU socket ID, as depicted in block 304, refers to the first CPU socket ID of the sequence of CPU socket IDs being selected. The particular CPU (corresponding to the current CPU socket ID) that is being evaluated in a particular CPU validation iteration is referred to herein as the "evaluated CPU."

Pursuant to block 308 (the beginning of a CPU validation iteration), the boot CPU communicates with a BMC of the computer platform to retrieve a CPU validation record that is associated with, or corresponds to, the current CPU socket ID. In an example, the CPU validation record includes data that represents a signed enclave image and further represents an owner epoch value. The CPU validation record 174 of FIG. 1 is an example of such a CPU validation record.

Pursuant to block 312 of the technique 300, the boot CPU updates the owner epoch value of the evaluated CPU with the owner epoch from the CPU validation record. In an example, if the boot CPU is the evaluated CPU, then the boot CPU executes an instruction to load the owner epoch value into the boot CPU's owner epoch key register. In another example, If the evaluated CPU is not the boot CPU, then the boot CPU writes instructions to the system memory for the evaluated CPU to execute for purposes of causing the evaluated CPU to load the owner epoch value.

Pursuant to block 316, the boot CPU next requests the evaluated CPU to load the signed enclave image from the CPU validation record. If the boot CPU is the evaluated CPU, then block 316 involves the boot CPU executing instructions that corresponds to a request for the boot CPU to load the signed enclave image. If the evaluated CPU is different from the boot CPU, then blocks 316 involves the boot CPU writing instructions to the system memory for the evaluated CPU to execute and corresponding to a request for the evaluated CPU to load the signed enclave image.

The evaluated CPU's loading of the signed enclave image may or may not be successful, depending on the evaluated CPU's cryptographic signing key. More specifically, the evaluated CPU applies a hashing algorithm to the content of the signed enclave image for purposes of deriving a first hash. For purposes of evaluating the signed enclave image, the evaluated CPU further decrypts a signature (e.g., a signature contained in a header of the signed enclave image) with a decryption key corresponding to the evaluated CPU's cryptographic signing key for purposes of deriving a second hash. In an example, the cryptographic signing key is a symmetric key, and the evaluated CPU uses the evaluated CPU's cryptographic signing key to decrypt the signature. The evaluated CPU then compares the first and second hashes. If the two hashes are the same, then the evaluated CPU's validation of the signed enclave image passes, and otherwise, the validation fails. If the evaluated CPU's validation of the signed enclave image passes, then the evaluated CPU launches an enclave corresponding to the signed enclave image. Otherwise, the evaluated CPU generates an error responsive to the validation of the signed enclave image failing (i.e., the request to load the signed enclave image failed).

Pursuant to decision block 324, the boot CPU determines whether the request to load the signed enclave image was successful. If not (e.g., the evaluated CPU generated an error), then, pursuant to block 328, the boot CPU notifies a BMC of the computer platform about the unsuccessful validation of the evaluated CPU. In accordance with further example implementations, the boot CPU may log the CPU validation failure, and at the conclusion of the technique 300, notify the BMC about the failed CPU validation. In another example, in accordance with some implementations, the boot CPU may log both CPU validation passes and CPU validation failures, and at the conclusion of the technique 300, the boot CPU may notify the BMC about the pass/fail CPU validation status for each CPU socket ID of the computer platform.

At the end of the CPU validation iteration, the boot CPU evaluates (decision block 332) whether there is another CPU validation iteration to perform (i.e., determines whether there is one or multiple other CPUs to validate). If so, then the boot CPU selects (block 340) the next CPU socket ID, and control returns to block 308 for purposes of performing another CPU validation iteration. Otherwise, the technique 300 terminates, as the CPUs for all CPU socket IDs have been validated.

Figure 4:
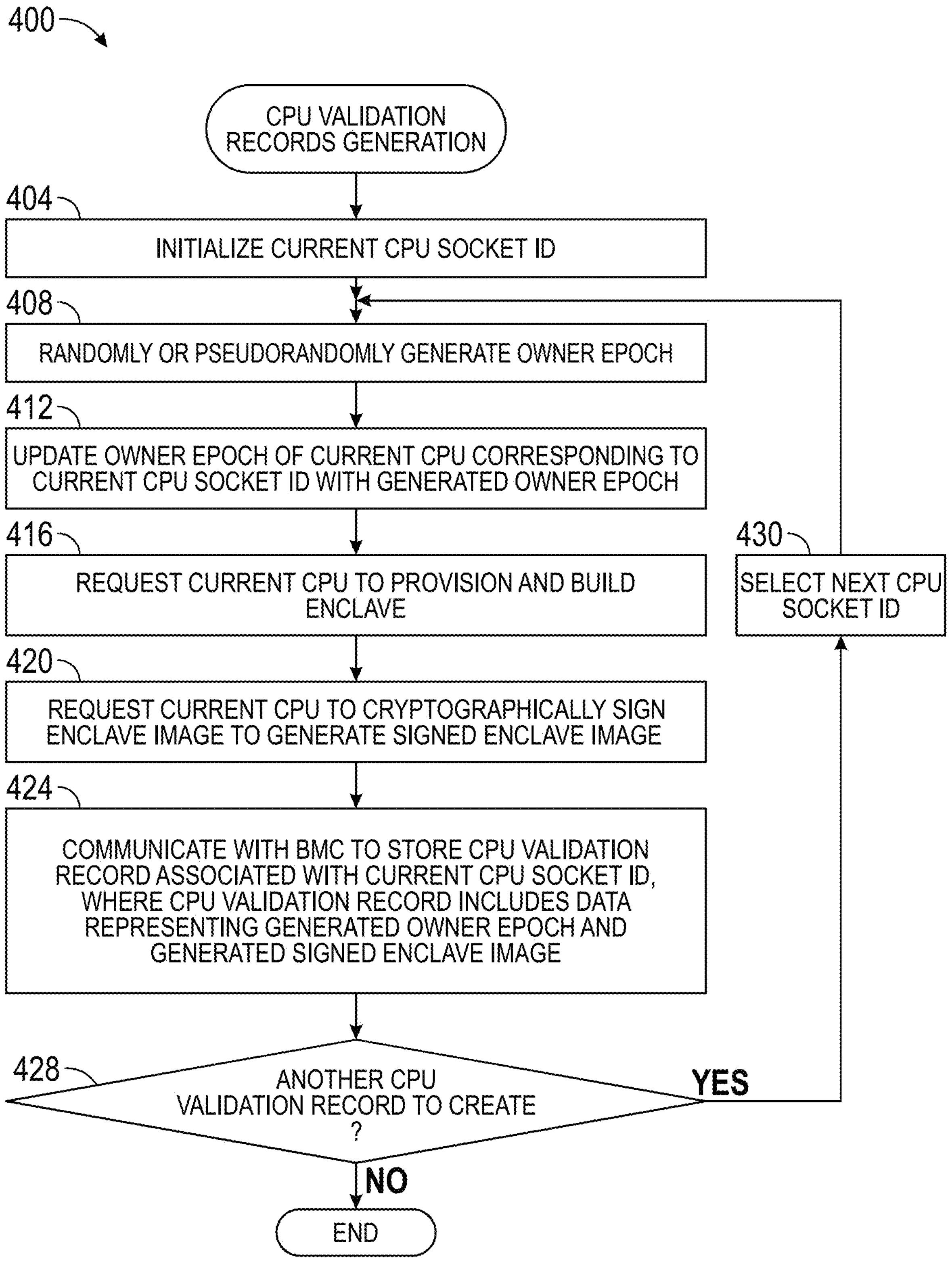
FIG. 4 is a flow diagram depicting a technique to generate CPU validation records for a computer platform, according to an example implementation.

Referring to FIG. 4, a technique 400 that may be performed by a boot CPU of a computer platform for purposes of creating signed enclave image-based CPU validation records and storing the CPU validation records in the computer platform for later use. In an example, the technique 400 may be performed by the boot CPU 114-1 of the computer platform 110-1 of FIG. 1. In an example, the boot CPU executes firmware instructions that are enabled, or selected, in a pre-production mode of operation for the computer platform. In an example, the OEM of the computer platform may place the computer platform in the pre-production mode of operation and select a boot option to cause the boot CPU to perform the technique 400. The computer platform 110-1 is an example of the computer platform, and the CPU validation records 174 of FIG. 1 are examples of the signed enclave image-based CPU validation records that are generated by the technique 400.

In accordance with example implementations, the firmware instructions correspond to a part of an UEFI application that, responsive to the computer platform being in a pre-production mode of operation, are executed by a boot CPU to form an agent to generate CPU validation records. Moreover, responsive to the computer platform being in a production mode of operation, the boot CPU executes other instructions correspond to another part of the UEFI application to form an agent to validate the CPUs of the computer platform based on the CPU validation records.

The technique 400 includes the boot CPU performing multiple iterations (called "CPU validation record generation iterations" herein). Each CPU validation record generation iteration corresponds to blocks 408 to 424 of FIG. 4. Each CPU validation record generation iteration produces a CPU validation record that corresponds to a specific combination of a CPU socket ID and CPU. Stated differently, each CPU validation record generation iteration corresponds to a particular CPU and a particular CPU socket in which the particular CPU is installed.

Pursuant to block 404, the boot CPU initializes the current CPU socket ID for the upcoming CPU validation record generation iteration. The initialization of the current CPU socket ID in block 404 selects the first CPU socket ID of a sequence of CPU socket IDs. In the following discussion, the "current CPU" refers to the CPU whose CPU validation record is being generated.

Pursuant to block 408 (the beginning of the CPU validation record generation iteration), the boot CPU randomly or pseudorandomly generates an owner epoch value. Pursuant to block 412, the boot CPU updates the owner epoch value of the current CPU with the generated owner epoch value. For this purpose, if the current CPU is the boot CPU, then the boot CPU executes an instruction to load the generated owner epoch value to the boot CPU's epoch owner key register. If the current CPU is a CPU other than the boot CPU, then the boot CPU writes an instruction to system memory for purposes of causing the other CPU to load the generated owner epoch value into the other CPU's owner epoch key register.

Next, pursuant to block 416, the boot CPU requests the current CPU to provision and build an enclave. If the boot CPU is the current CPU, then provisioning and building of the enclave includes the boot CPU executing instructions for this purpose. If the current CPU is another CPU of the computer platform, then the boot CPU writes instructions to the system memory to cause the other CPU to provision and build the enclave.

The building of the enclave by the current CPU produces a corresponding enclave image. In general, an enclave image contains information from which a CPU may build and launch an enclave. In an example, this information includes data and instructions for the enclave. In another example, the information includes measurements of the enclave. In another example, the information includes a file system for the enclave. In an example, the enclave image is a file (e.g., a library file). It is noted that the enclave may have any of a variety of data and/or instructions, as the content of the enclave is not used for validation purposes, but rather, a CPU's response to a request to load the corresponding signed enclave image is used to validate the CPU.

Next, pursuant to block 420, the boot CPU requests the current CPU to cryptographically sign the enclave image to generate a corresponding signed enclave image. If the boot CPU is the current CPU, then the boot CPU executes instructions to cause the boot CPU to use the boot CPU's cryptographic signing key to sign the enclave image. If the current CPU is a CPU other than the boot CPU, then the boot CPU writes instructions to system memory for purposes of causing the other CPU to sign the enclave image using the other CPU's cryptographic signing key. The current CPU internally derives its cryptographic signing key using a key derivation function based on multiple key components, such as the owner epoch value, a fuse key input and a version key input. Regardless of how the cryptographic signing key is derived, the cryptographic signing key is unique to the current CPU, and the current CPU prevents the cryptographic signing key from being exported or otherwise exposed outside of the current CPU.

Pursuant to block 424 of the technique 400, the boot CPU communicates with a BMC of the computer platform to store a CPU validation record associated with the current CPU socket ID. The CPU validation record includes data representing the generated owner epoch value and further representing the generated signed enclave image. In an example, block 424 includes the boot CPU communicating with the BMC for purposes of storing the CPU validation in a memory whose access is controlled by the BMC. In an example, the memory may be located in a secure enclave of the BMC, such as, for example, the non-volatile memory 273 of the BMC 260 (FIG. 2A). In another example, block 424 includes the boot CPU communicating with the BMC for purposes of storing the CPU validation record in a memory that is controlled by the BMC but is external to the BMC. The non-volatile memory 270 of FIG. 2B is an example of such a memory. In another example, the CPU validation record may be stored in a non-volatile memory having an access that is not controlled by a BMC. In examples, the CPU validation record may be stored in an NVRAM of a trusted platform module (TPM) of the computer platform or in any other non-volatile memory of the computer platform.

The boot CPU next determines (decision block 428) whether there is another CPU validation record to create. In an example, decision block 424 includes the boot CPU determining whether there is another CPU socket ID to process. If so, the boot CPU selects (block 430) the next CPU socket ID, and control returns to block 408 to perform another CPU validation record generation iteration. Otherwise, CPU validation records for all CPUs of the computer platform have been generated, and the technique 400 terminates.

Other implementations are contemplated, which are within the scope of the appended claims. For example, in accordance with further implementations, a management controller other than a BMC may perform one or multiple remedial actions in response to a CPU failing validation. In an example, a chassis management controller may perform remedial actions in response to CPU validation failures for servers in a rack associated with the chassis management controller. In another example, a computer platform may contain a smart I/O peripheral (also called a "data processing unit," or "DPU;" or an "infrastructure processing unit," or "IPU") that performs remedial actions in response to CPU validation failures for the computer platform. In another example, a remote management server (e.g., the remote management server 194 of FIG. 1) may perform remedial actions in response to CPU validation failures for any of a collection of computer platforms that are managed by the remote management server. In another example, for purposes of validating a CPU, the CPU validation agent may, prior to initiating a request for the CPU to load a signed enclave image from the CPU validation record, request the CPU to load another signed enclave image that is expected to fail. In this manner, the request to load the other signed enclave image may be used as a preliminary CPU validation test to determine whether the CPU has been modified to not fail any request to load a signed enclave image, and if the CPU does not fail the request to load the other signed enclave image, then the CPU fails validation.

Figure 5:
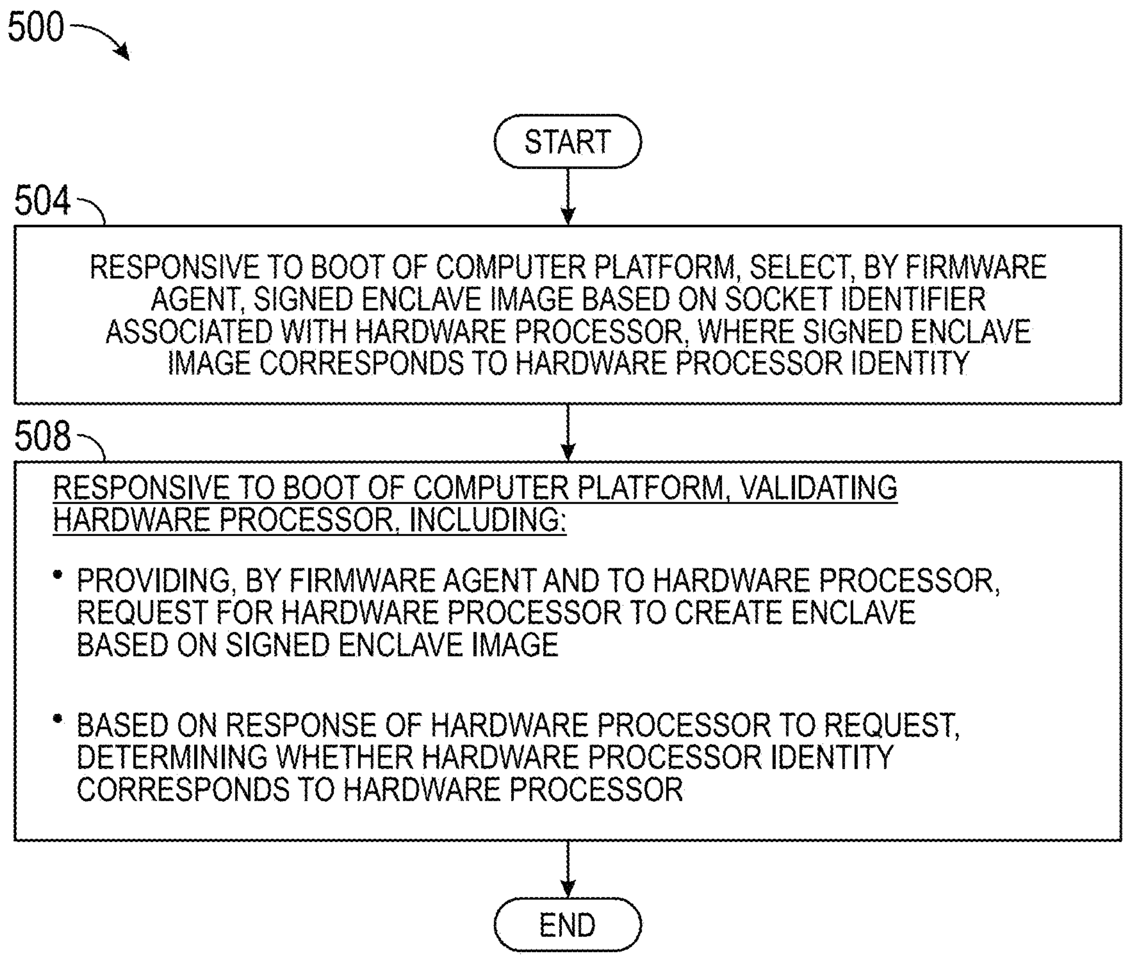
FIG. 5 is a flow diagram depicting a technique to validate a hardware processor using a signed enclave image, according to an example implementation.

Referring to FIG. 5, in accordance with example implementations, a technique 500 includes, responsive to a boot of a computer platform, selecting (block 504), by a firmware agent, a signed enclave image based on a socket identifier that is associated with a hardware processor. The signed enclave image corresponds to a hardware processor identity. In an example, the hardware processor is a CPU that has enclave management hardware. In an example, the hardware processor identity corresponds to a cryptographic signing key of the hardware processor. In an example, the hardware processor prevents the cryptographic signing key from being exported or otherwise exposed outside of the hardware processor.

In an example, the hardware processor is constructed to internally apply a key derivation function to generate the cryptographic signing key. In an example, an input corresponding to fuses of the hardware processor is provided to the key derivation function. In an example, an input corresponding to a version of an enclave management circuit of the hardware processor is provided to the key derivation function. In an example, an input corresponding to an enclave software version is provided to the key derivation function. In an example, an input corresponding to a microcode version is provided to the key derivation function. In an example, an input corresponding to an owner epoch value is provided to the key derivation function.

In an example, the computer platform is a server. In an example, the computer platform is an enclosure-based server, such as a blade server. In another example, the computer platform is a rack-based server, such as a DL server. In another example, the server is a tower server. In other examples, the computer platform may be a component other than a server, such as a client, a desktop, a gateway, a network switch, a storage array, a laptop computer, a tablet computer, a consumer electronics device, an appliance, or, in general, any other processor-based electronic device.

The technique 500 includes, pursuant to block 508, responsive to the boot of the computer platform validating the hardware processor. In an example, validating the hardware processor includes determining whether the hardware processor is the same as an expected hardware processor. In an example, the expected hardware processor is a hardware processor that is installed by an OEM of the computer platform. In an example, validating the hardware processor includes determining whether the hardware processor has an expected cryptographic signing key that corresponds to the cryptographic signing key of the expected hardware processor.

The validation of the hardware processor includes, responsive to the boot of the computer platform, providing, by a firmware agent and to the hardware processor, a request for the hardware processor to create an enclave based on a signed enclave image. In an example, the request corresponds to a request for the hardware processor to load the signed enclave image. In an example, the signed enclave image corresponds to an image signed by an expected hardware processor using the expected hardware processor's cryptographic signing key.

In an example, the hardware processor, in response to the request to load the signed enclave image, validates the signed enclave image. In an example, the validation includes the hardware processor applying a hash algorithm to a content of the signed enclave image for purposes of deriving a first hash. The validation further includes the hardware processor decrypting a signature of the signed enclave image. In an example, the decrypting of the signature includes the hardware processor applying a decryption key corresponding to the hardware processor's cryptographic signing key to the signature for purposes of decrypting the signature to provide a second hash. In an example, the hardware processor's cryptographic signing key is a symmetric AES key, and the hardware processor decrypts the signature using the cryptographic signing key. The validation further includes the hardware processor comparing the first and second hashes for purposes of determining whether or not the hashes are the same. If the hashes are the same, then the signed enclave image successfully passes the hardware processor's validation of the signed enclave image, and as a result, the hardware processor launches the corresponding enclave. In an example, the unsuccessful validation of the signed enclave image by the hardware processor causes the hardware processor to generate an error, causing the request to load the signed enclave image to fail.

As depicted in block 508, responsive to the boot of the computer platform, validating the hardware processor further includes, based on a response of the hardware processor to the request to create the enclave, determining whether the hardware processor identity corresponds to the hardware processor. In an example, in response to the hardware processor's successful loading of the signed enclave image, a determination is made that the hardware processor identity corresponds to the hardware processor. In another example, in response to the hardware processor generating an error indicating a failure of the loading of the signed enclave image, a determination is made that the hardware processor does not correspond to the hardware processor identity.

Figure 6:
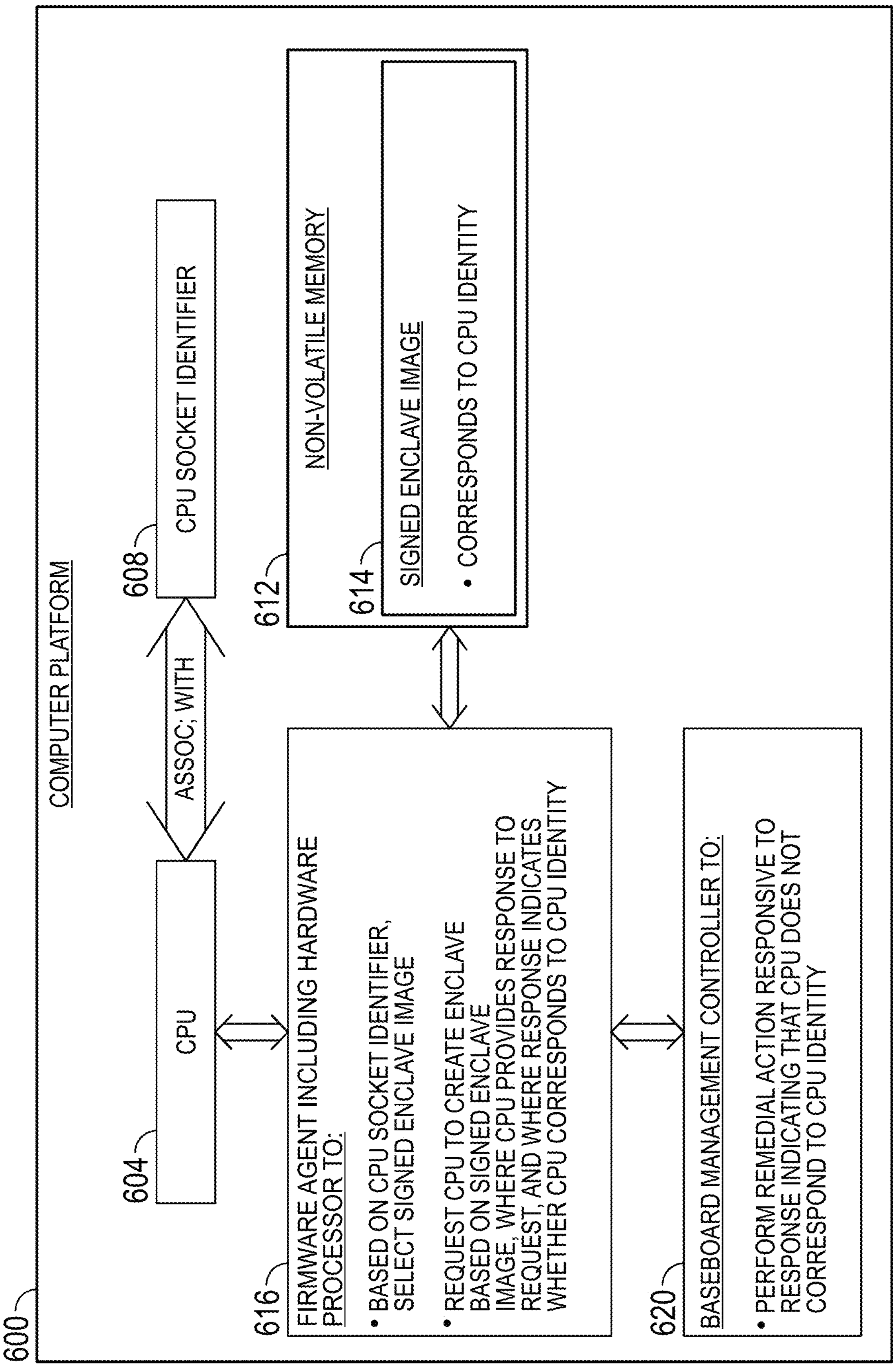
FIG. 6 is a block diagram of a computer platform having a firmware agent to validate a CPU using a signed enclave image, according to an example implementation.

Referring to FIG. 6, in accordance with example implementations, a computer platform 600 includes a CPU 604, a firmware agent 616, a non-volatile memory 612 and a baseboard management controller 620. The CPU 604 is associated with a CPU socket identifier 608. In an example, the CPU 604 is associated with a package, such as an LGA package, a BGA package or a package that corresponds to another encapsulation technology. In an example, the firmware agent 616 is associated with an UEFI application.

In an example, the CPU 604 includes an enclave management circuit. In an example, the CPU 604 has a collection of cryptographic keys that the CPU 604 generates internally using a key derivation function, and the CPU 604 prevents the cryptographic keys from being exported or otherwise exposed outside of the CPU 604. In an example, the CPU 604 is constructed to internally apply a key derivation function to generate the cryptographic signing key. In an example, an input corresponding to fuses of the CPU 604 is provided to the key derivation function. In an example, an input corresponding to a version of an enclave management circuit of the CPU 604 is provided to the key derivation function. In an example, an input corresponding to an enclave software version is provided to the key derivation function. In an example, an input corresponding to a microcode version is provided to the key derivation function. In an example, an input corresponding to an owner epoch value is provided to the key derivation function.

In an example, the computer platform 600 is a server. In an example, the computer platform 600 is an enclosure-based server, such as a blade server. In another example, the computer platform 600 is a rack-based server, such as a DL server. In another example, the server is a tower server. In other examples, the computer platform 600 may be a component other than a server, such as a client, a desktop, a gateway, a network switch, a storage array, a laptop computer, a tablet computer, a consumer electronics device, an appliance, or, in general, any other processor-based electronic device.

In an example, the non-volatile memory 612 is an internal memory of the baseboard management controller 620. In an example, the non-volatile memory 612 is located in a secure enclave of the baseboard management controller 620. In an example, the non-volatile memory 612 is external to the baseboard management controller 620, and the baseboard management controller 620 controls access to the non-volatile memory 620. In an example, the non-volatile memory 612 is a NVRAM. In another example, the non-volatile memory 612 is a NAND flash memory.

The firmware agent 616 includes a hardware processor to, based on the CPU socket identifier, select a signed enclave image 614 that is stored in the non-volatile memory 612. The signed enclave image 614 corresponds to a CPU identity. In an example, the hardware processor is a boot CPU of the computer platform 600. In an example, the CPU 604 is a boot CPU of the computer platform 600. In another example, the CPU 604 is a non-boot CPU of the computer platform 600.

In an example, the signed enclave image 614 is signed by an expected CPU that corresponds to the CPU identity and is expected to be installed in a CPU socket associated with the CPU socket identifier 608. In an example, the expected CPU signed the signed enclave image 614 using the expected CPU's cryptographic signing key. In an example, the expected CPU applied a hash algorithm to a content of an enclave image to generate a hash, encrypted the hash using the expected CPU's cryptographic signing key to provide a signature and added the signature to the enclave image to provide the signed enclave image.

The hardware processor of the firmware agent 616 requests the CPU 604 to create an enclave based on the signed enclave image 614. The CPU 604 provides a response to the request, and the response indicates whether the CPU 604 corresponds to the CPU identity.

In an example, the request is a request for the CPU 604 to load the signed enclave image. In response to the request to load the signed enclave image, the CPU 604 validates the signed enclave image. In an example, the validation includes the CPU 604 applying a hash algorithm to a content of the signed enclave image for purposes of deriving a first hash. The validation further includes the CPU 604 decrypting a signature of the signed enclave image. In an example, the decrypting of the signature includes the CPU 604 applying a decryption key corresponding to the CPU's cryptographic signing key to the signature for purposes of decrypting the signature to provide a second hash. In an example, the CPU's cryptographic signing key is a symmetric AES key, and the CPU 604 decrypts the signature using the cryptographic signing key to provide the second hash. The validation further includes the CPU 604 comparing the first and second hashes for purposes of determining whether or not the hashes are the same. If the hashes are the same, then the signed enclave image successfully passes the CPU's validation of the signed enclave image, and as a result, the CPU 604 launches the corresponding enclave. In an example, the unsuccessful validation of the signed enclave image by the CPU 604 causes the CPU 604 to generate an error, causing the request to load the signed enclave image to fail.

The baseboard management controller 620 performs a remedial action responsive to the response (provided by the CPU 604) indicating that the CPU 604 does not correspond to the CPU identity. In an example of a remedial action taken due to a CPU validation failure, the baseboard management controller 620 sends a message to a remote management server, reporting the CPU validation failure. In an example, the message contains data representing information about the CPU validation failure, such as the CPU socket ID, information about the expected CPU and a detection timestamp. In another example of a remedial action taken due to a CPU validation failure, the baseboard management controller 620 records information (e.g., CPU socket ID, expected CPU information and a detection timestamp) about the CPU validation failure in a computer platform event log. In another example of a remedial action taken due to a CPU validation failure, the baseboard management controller 620 powers down the main power supply of the computer platform 600. Moreover, on the next boot of the computer platform 600, the baseboard management controller 620 (which operates on an auxiliary power supply) generates a displayed prompt that informs of the CPU validation failure and requests authorization of the boot by a user having the appropriate administrative credentials before allowing the boot to continue. In another example of a remedial action taken in response to a CPU validation failure, the baseboard management controller 620 does not allow the computer platform 600 to join a fleet of computer platforms. In another example of a remedial action taken in response to a CPU validation failure, the baseboard management controller 620 requests authorization by a user having the appropriate administrative credentials before allowing the computer platform 600 to join a fleet of computer platforms.

Figure 7:
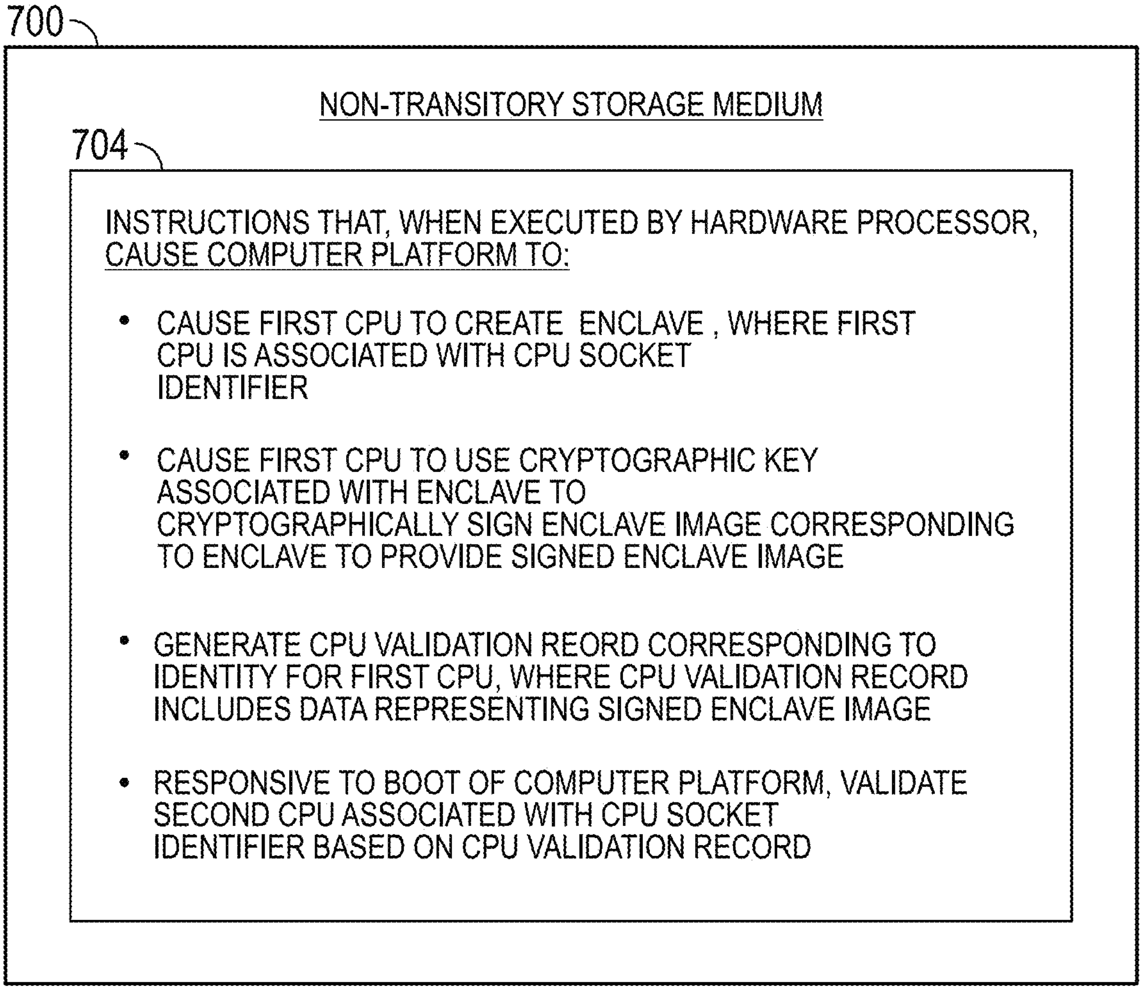
FIG. 7 is an illustration of hardware processor-readable instructions that are stored on a non-transitory storage medium and when executed by a hardware processor, cause a computer platform to generate a signed enclave image and use the signed enclave image during a boot of the computer platform to validate a CPU, according to an example implementation.

Referring to FIG. 7, in accordance with example implementations, a non-transitory storage medium 700 stores instructions 704. The instructions 704, when executed by a hardware processor, causes the computer platform to cause a first CPU to create an enclave. The first CPU is associated with a CPU socket identifier.

In an example, the computer platform is a server. In an example, the computer platform is an enclosure-based server, such as a blade server. In another example, the computer platform is a rack-based server, such as a DL server. In another example, the server is a tower server. In other examples, the computer platform is a component other than a server, such as a client, a desktop, a gateway, a network switch, a storage array, a laptop computer, a tablet computer, a consumer electronics device, an appliance, or, in general, any other processor-based electronic device.

In an example, the hardware processor is a boot CPU of the computer platform. In an example, the boot CPU executes firmware instructions that are enabled, or selected, in a pre-production mode of operation for the computer platform. In an example, the OEM of the computer platform may place the computer platform in the pre-production mode of operation and select a boot option to cause the boot CPU to execute the instructions 704.

In an example, part of the instructions 704 correspond to the computer platform being in a pre-production mode of operation for purposes of causing the boot CPU to form an agent to generate CPU validation records. Moreover, another part of the instructions 704 correspond to the computer platform being in a production mode of operation for purposes of causing the boot CPU to form an agent to validate the CPUs of the computer platform based on the CPU validation records.

The instructions 704, when executed by the hardware processor, cause the computer platform to cause the first CPU to use a cryptographic key associated with the enclave to cryptographically sign an enclave image corresponding to the enclave to provide a signed enclave image. In an example, the first CPU signs the enclave image using the first CPU's cryptographic signing key. In an example, the first CPU applies a hash algorithm to a content of the enclave image to generate a hash, encrypts the hash using the first CPU's cryptographic signing key to provide a signature and adds the signature to the enclave image to provide the signed enclave image.

In an example, the first CPU is constructed to internally apply a key derivation function to generate the cryptographic signing key. In an example, an input corresponding to fuses of the first CPU is provided to the key derivation function. In an example, an input corresponding to a version of an enclave management circuit of the first CPU is provided to the key derivation function. In an example, an input corresponding to an enclave software version is provided to the key derivation function. In an example, an input corresponding to a microcode version is provided to the key derivation function. In an example, an input corresponding to an owner epoch value is provided to the key derivation function.

The instructions 704, when executed by the hardware processor, further cause the computer platform to generate a CPU validation record that corresponds to an identity for the first CPU. The record includes data representing the signed enclave image. In an example, the hardware processor randomly or pseudorandomly generates an owner epoch value for the first CPU and loads an owner epoch key register of the first CPU with the owner epoch value prior to the first CPU signing the enclave image. In an example, generating the CPU validation record further includes the hardware processor including, in the CPU validation record, data that represents the owner epoch value.

The instructions 704, when executed by the hardware processor, further cause the computer platform to, responsive to a boot of the computer platform, validate a second CPU that is associated with the CPU socket identifier based on the CPU validation record. In an example, validating the second CPU includes requesting the second CPU to load the signed enclave image. In an example, the failure of the second CPU to load the signed enclave image indicates that the first and second CPUs are different. In an example, successful loading of the signed enclave image by the first CPU indicates that the first and second CPUs are the same.

In accordance with example implementation, a key component value is selected by the firmware agent based on the socket identifier. The key component value corresponds to the hardware identity. Validating the hardware processor further includes prior to providing the request, updating, by the firmware agent and based on the key component value, a component of a cryptographic key used by the hardware processor. Among the potential advantages, the CPU validation does not rely on self-reported identifying information and does not expose information that uniquely identifies CPUs.

In accordance with example implementations, the key component value is an owner epoch value. Among the potential advantages, the CPU validation does not rely on self-reported identifying information and does not expose information that uniquely identifies CPUs.

In accordance with example implementations, the firmware agent communicates with a management controller of the computer platform to retrieve the signed enclave image from a non-volatile memory that is managed by the management controller. Among the potential advantages, the CPU validation does not rely on self-reported identifying information and does not expose information that uniquely identifies CPUs.

In accordance with example implementations, the non-volatile memory includes at least one of a memory of the management controller, or a memory having an access controlled by the management controller. Among the potential advantages, the CPU validation does not rely on self-reported identifying information and does not expose information that uniquely identifies CPUs.

In accordance with example implementations, the management controller initiates a remedial action responsive to determining that the hardware processor identity does not correspond to the hardware processor. Among the potential advantages, the CPU validation does not rely on self-reported identifying information and does not expose information that uniquely identifies CPUs.

In accordance with example implementations, initiating the remedial action includes one of generating an alert, logging an entry representing that the hardware processor did not pass validation, preventing the computer platform from joining a network, aborting the boot, or regulating a reboot of the computer platform. Among the potential advantages, the CPU validation does not rely on self-reported identifying information and does not expose information that uniquely identifies CPUs.

In the context that is used herein, a baseboard management controller, or "BMC," is a specialized service processor that monitors the physical state of a server or other hardware using sensors and communicates with a management system through a management network. The BMC may also communicate with applications executing at the operating system level through an input/output controller (IOCTL) interface driver, a representational state transfer (REST) application program interface (API), or some other system software proxy that facilitates communication between the BMC and applications. The BMC may have hardware level access to hardware devices that are located in a server chassis including system memory. The BMC may be able to directly modify the hardware devices. The BMC may operate independently of the operating system of the system in which the BMC is disposed. A BMC may be located on the motherboard or main circuit board of the server or other device to be monitored.

The fact that a BMC is mounted on a motherboard of the managed server/hardware or otherwise connected or attached to the managed server/hardware does not prevent the BMC from being considered "separate" from the server/hardware. As used herein, BMC has management capabilities for sub-systems of a computing device, and is separate from a processing resource that executes an operating system of a computing device. The BMC is separate from a processor, such as a central processing unit, which executes a high-level operating system or hypervisor on a system.

In the context that is used herein, a "hash" (which may also be referred to by such terminology as a "digest," "hash value," or "hash digest") is produced by the application of a cryptographic hash algorithm to an input value. A cryptographic hash algorithm receives an input value, and the cryptographic hash algorithm generates a hexadecimal string (the digest, or hash) to match the input value. In an example, the input value may include a string of data (for example, a data structure in memory denoted by a starting memory address and an ending memory address). In such an example, based on the string of data, the cryptographic hash algorithm outputs a hexadecimal string (the digest, or hash). Any minute change to the input value alters the output hexadecimal string. In examples, the cryptographic hash function may be a secure hash algorithm (SHA), a Federal Information Processing Standards (FIPS)-approved hash algorithm, a National Institute of Standards and Technology (NIST)-approved hash algorithm, or any other cryptographic hash algorithm. In some examples, instead of a hexadecimal format, another format may be used for the string.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated recorded items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

responsive to a boot of a computer platform:

selecting, by a firmware agent, a signed enclave image based on a socket identifier associated with a hardware processor, wherein the signed enclave image corresponds to a hardware processor identity; and validating the hardware processor, comprising:

providing, by the firmware agent and to the hardware processor, a request for the hardware processor to create an enclave based on the signed enclave image; and based on a response of the hardware processor to the request, determining whether the hardware processor identity corresponds to the hardware processor.

2. The method of claim 1, further comprising selecting, by the firmware agent and based on the socket identifier, a key component value corresponding to the hardware identity, wherein validating the hardware processor further comprises prior to providing the request, updating, by the firmware agent and based on the key component value, a component of a cryptographic key used by the hardware processor.

3. The method of claim 2, wherein the key component value comprises an owner epoch value.

4. The method of claim 1, further comprising communicating, by the firmware agent, with a management controller of the computer platform to retrieve the signed enclave image from a non-volatile memory managed by the management controller.

5. The method of claim 4, wherein the non-volatile memory comprises at least one of a memory of the management controller, or a memory having an access controlled by the management controller.

6. The method of claim 5, wherein initiating the remedial action comprises one of generating an alert, logging an entry representing that the hardware processor did not pass validation, preventing the computer platform from joining a network, aborting the boot, or regulating a reboot of the computer platform.

7. The method of claim 1, further comprising responsive to determining that the hardware processor identity does not correspond to the hardware processor, initiating, by a management controller, a remedial action.

8. A computer platform comprising:

a CPU having an associated CPU socket identifier;

a non-volatile memory to store a signed enclave image, wherein the signed enclave image corresponds to a CPU identity;

a firmware agent comprising a hardware processor to:

based on the CPU socket identifier, select the signed enclave image file; and request the CPU to create an enclave based on the signed enclave image, wherein the CPU provides a response to the request, and wherein the response indicates whether the CPU corresponds to the CPU identity; and a baseboard management controller to perform a remedial action responsive to the response indicating that the CPU does not correspond to the CPU identity.

9. The computer platform of claim 8, wherein the hardware processor to further:

provide a request to the CPU for the CPU to load the signed enclave image; and determine whether the CPU corresponds to the CPU identity based on a response of the CPU to the request to the CPU for the CPU to load the signed enclave image.

10. The computer platform of claim 9, wherein the hardware processor to further:

determine that the CPU does not correspond to the CPU identity responsive to the CPU indicating the request to the CPU for CPU to load the signed enclave image failed.

11. The computer platform of claim 9, wherein the hardware processor to further:

based on the CPU socket identifier, select a validation record comprising data representing the signed enclave image file and representing an owner epoch value;

load the owner epoch value into an owner epoch key register of the CPU; and responsive to the loading of the owner epoch key into the owner epoch key register, request the CPU to create the enclave based on the signed enclave image.

12. The computer platform of claim 9, wherein the hardware processor to execute instructions associated with a firmware boot application to select the signed enclave image file and request the CPU to create the enclave based on the signed enclave image.

13. The computer platform of claim 9, wherein the signed enclaved image is signed by a CPU having the CPU identity.

14. The computer platform of claim 9, wherein the hardware processor corresponds to a boot CPU other than the CPU having the associated CPU socket identifier.

15. The computer platform of claim 9, wherein the CPU comprises a boot CPU.

16. The computer platform of claim 9, wherein:

the hardware processor to provide a request, to the CPU, for the CPU to load the signed enclave image;

the CPU, responsive to the request for the CPU to load the signed enclave image validates the signed enclave image based on a cryptographic signing key of the CPU;

the CPU provides a result of the validation of the signed enclave image; and the hardware processor to determine whether the CPU corresponds to the CPU identity responsive to the result of the validation of the signed enclave image.

17. The computer platform of claim 16, wherein:

the signed enclave image comprises a signature and a content; and the CPU to further, responsive to the request for the CPU to load the signed enclave image:

apply a hash algorithm to the content to provide a first hash;

use a decryption key corresponding to the cryptographic signing key to decrypt the signature to provide a second hash; and determine whether to load the signed enclave image based on a comparison of the first hash to the second hash.

18. A non-transitory storage medium to store instructions that, when executed by a hardware processor, cause a computer platform to:

cause a first CPU to create an enclave, wherein the first CPU is associated with a CPU socket connector identifier;

cause the first CPU to use a cryptographic key associated with the enclave to cryptographically sign an enclave image corresponding to the enclave to provide a signed enclave image;

generate a CPU validation record corresponding to an identity for the first CPU, wherein the CPU validation record comprises data representing the signed enclave image; and responsive to a boot of the computer platform, validate a second CPU associated with the CPU socket identifier based on the CPU validation record.

19. The non-transitory storage medium of claim 18, wherein the instructions, when executed by the hardware processor further cause the computer platform to:

generate an owner epoch value;

load the owner epoch value in the first CPU;

cause the first CPU to load the owner epoch value prior to causing the first CPU to use the cryptographic key to cryptographically sign the enclave image; and include the owner epoch value in the CPU validation record.

20. The non-transitory storage medium of claim 18, wherein the instructions, when executed by the hardware processor further cause the computer platform to associate the CPU validation record with the CPU socket connector identifier.

* * * * *